United States Patent [19]

Klein

[11] 4,112,344

[45] Sep. 5, 1978

[54] RECORD FEEDING APPARATUS AND METHOD

[75] Inventor: Rudolph J. Klein, Centerville, Ohio

[73] Assignee: Monarch Marking Systems, Inc., Dayton, Ohio

[21] Appl. No.: 655,174

[22] Filed: Feb. 4, 1976

Related U.S. Application Data

[62] Division of Ser. No. 537,481, Dec. 30, 1974, Pat. No. 4,002,277.

[51] Int. Cl.$^2$ .............................................. G05B 19/40
[52] U.S. Cl. ................................... 318/685; 318/138; 318/254; 318/696
[58] Field of Search ................ 318/685, 696, 138, 254

[56] References Cited

U.S. PATENT DOCUMENTS

| | | | |
|---|---|---|---|
| 3,381,193 | 4/1968 | Smith | 318/138 |
| 3,750,000 | 7/1973 | Bruckner et al. | 318/696 |
| 3,886,459 | 5/1975 | Hufford et al. | 318/696 X |
| 3,997,829 | 12/1976 | Suzaki et al. | 318/685 |
| 4,000,452 | 12/1976 | Heine | 318/696 |

Primary Examiner—Robert K. Schaefer
Assistant Examiner—John J. Feldhaus
Attorney, Agent, or Firm—Joseph J. Grass

[57] ABSTRACT

There is disclosed a method of feeding record webs or sheets and apparatus for carrying out the method. The record feeding apparatus is shown in conjunction with a printing apparatus having a print head assembly, platen structure, a mechanism for severing a printed record from the remainder of the record and an inking mechanism. The record feeding apparatus includes an edge guide, a rotatable feed wheel having a planar frictional surface which engages one face of the web to exert a resultant drive force on the record when driven, the resultant force being comprised of a force vector of large magnitude extending in the longitudinal direction for feeding the record longitudinally and a force vector of small magnitude extending in the lateral direction for causing the record to be driven laterally to cause its side edge to be in guided contact with the edge guide. A roll cooperates with the frictional surface to provide a pinch point disposed either upstream longitudinally of the rotational axis and laterally between the rotational axis and the edge guide or downstream longitudinally of the rotational axis and laterally beyond the rotational axis. A record stepping method and stepping motor and stepping motor control logic are employed to carry out the method to accurately position the record for printing and severing. The stepping motor control logic includes circuitry for advancing the stepping motor either a full increment or one-half of a full increment to provide increased position accuracy without sacrificing drive speed. A current regulated stepping motor driving circuit is used to provide high stepping motor torque without drawing excessive current, and a variable rate stepping pulse generating circuit is employed for gradually accelerating and decelerating the stepping motor. Timout circuitry for disabling the operation of the stepping motor in the event of an abnormal condition is also provided.

11 Claims, 8 Drawing Figures

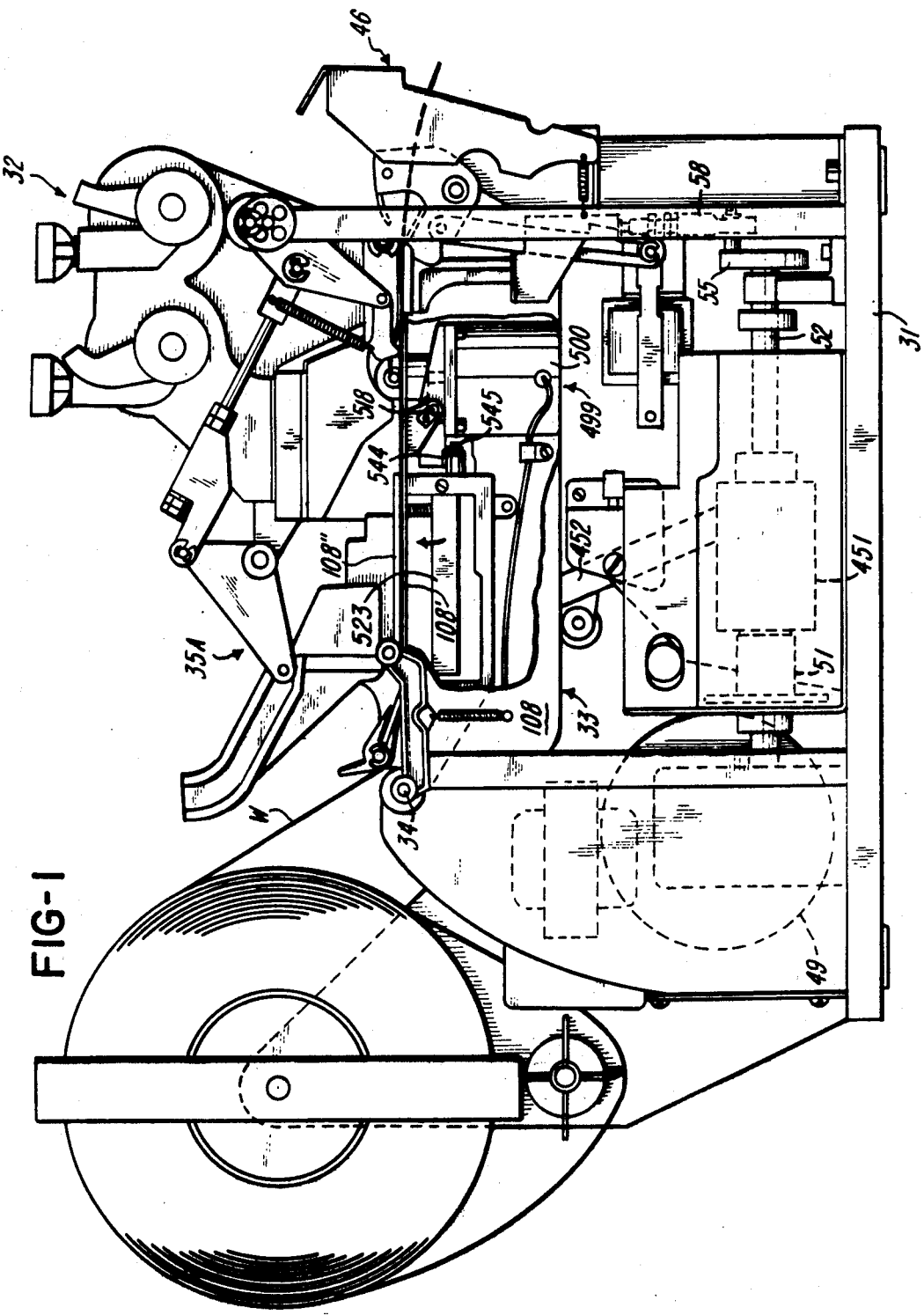

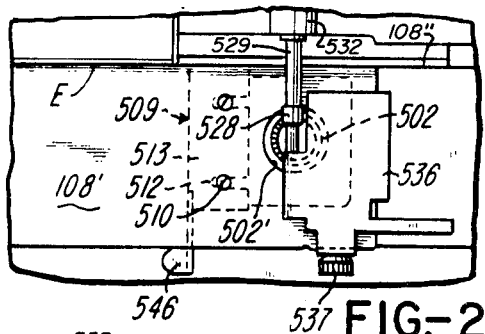
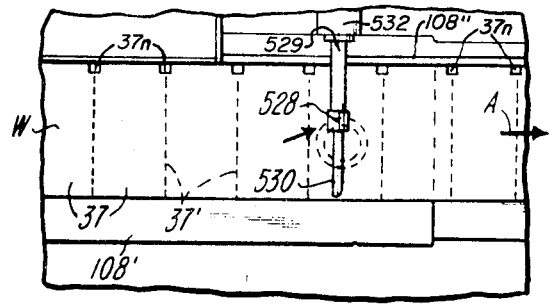
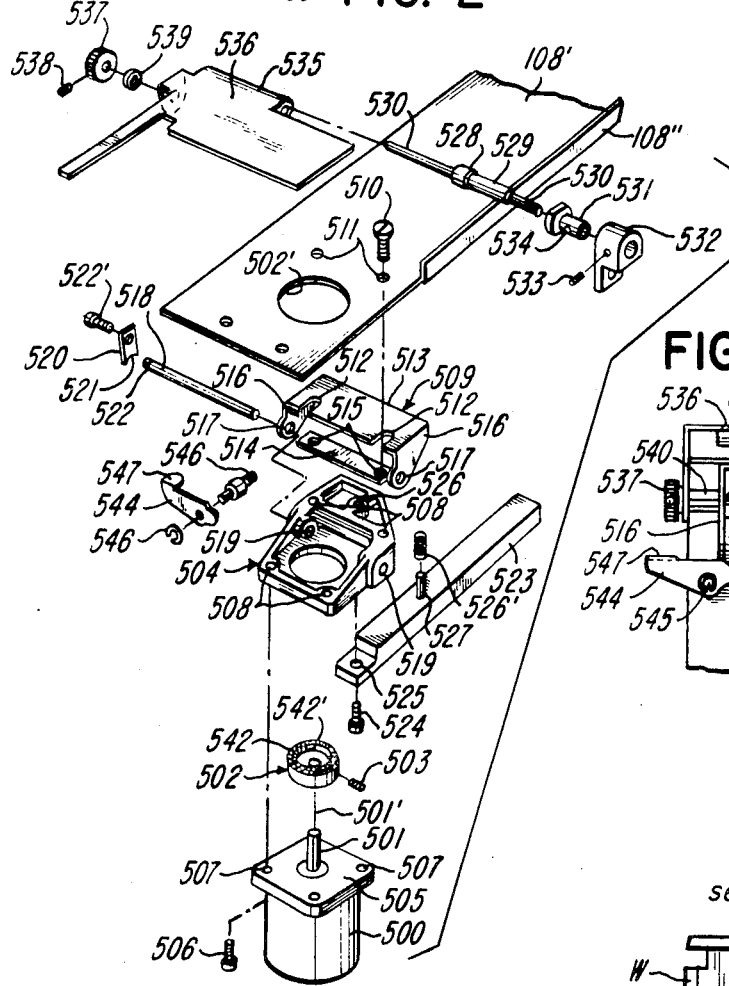
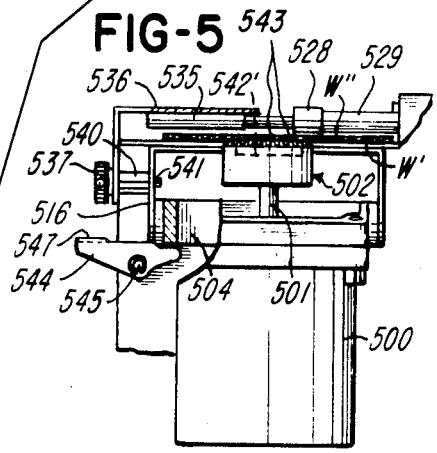
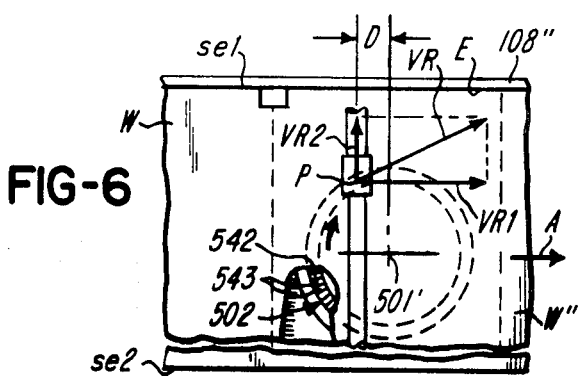
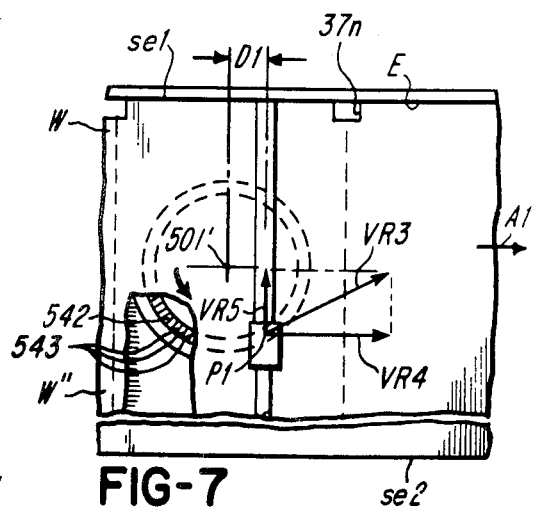

4,112,344

RECORD FEEDING APPARATUS AND METHOD

CROSS-REFERENCE TO RELATED APPLICATION

This is a division of application Ser. No. 537,481, filed Dec. 30, 1974, now U.S. Pat. No. 4,002,277.

BACKGROUND OF THE INVENTION

1. Field of the Invention

This invention relates to record feeding apparatus and methods.

2. Brief Description of the Prior Art

Prior art Martin, U.S. Pat. No. 2,300,625 and Masterson et al, U.S. Pat. No. 3,350,091 relate to apparatus for feeding sheets longitudinally while being guided at a side edge by an edge or side guide. Apparatus of this type generally involve a considerable number of parts, gears or pulleys and a special arrangement of bearings.

Various motor control circuits for controlling the feeding of a record web through record printing machines are known. Such systems generally use a continuously running motor coupled to a web advancing mechanism by means of a clutch mechanism which serves periodically to transmit power from the motor to the advancing mechanism for advancing the web. Other systems may use periodically energized motors or stepping motors for advancing the web.

Whereas these techniques serve to advance a web through a printing mechanism or the like, systems employing a clutch or periodically energized motors tend to be inaccurate in the positioning of the web in the printing mechanism. Stepping motor systems require a compromise to be made between step size and the accuracy of positioning because if the steps are made small enough to accurately position the web, the rate of advance is relatively slow unless excessively high stepping rates are used. If large enough steps to provide an acceptable advancing rate are used, inaccuracies in web positioning result.

SUMMARY OF THE INVENTION

One of the objects of the invention is to overcome the above mentioned deficiencies and to provide method and apparatus which accomplishes a high rate of advance with accompanying improved positioning accuracy. Briefly, a record stepping method and a stepping motor and stepping motor control mechanism to carry out the method are employed to register the record with the print head assembly and the severing mechanism. More specifically, the invention provides a novel method for transporting records whereby the record is gradually accelerated and decelerated by gradually increasing and decreasing the rate at which the windings of a stepping motor are energized, and whereby the record is positioned by energizing either one or two windings of the stepping motor to provide half step and full step increments of record travel. Such registration is accomplished by detecting a notch, or other index disposed on the record, with a photocell, or the like, and stepping the stepping motor a predetermined number of steps following the detection of the index to accurately position the record. The stepping motor is driven with a switching circuit that sequentially energizes the windings of the stepping motor in pairs to incrementally advance the stepping motor. The sequential energization is controlled by means of a variable speed clock that has a gradually increasing pulse rate for accelerating the stepping motor, and a gradually decreasing pulse rate for decelerating the stepping motor. Each of the stepping motor windings is energized by means of a switching mode current regulator which provides the drive necessary to maintain high stepping motor torque without drawing excessive current from the power supply. In addition, circuitry is provided for disabling the drive to one of the windings of the energized pair to provide a half step increment of stepping motor travel to provide an even more accurate positioning of the record, and timeout circuitry is provided to terminate the stepping operation in the event that an index is not detected within a predetermined amount of record travel.

BRIEF DESCRIPTION OF THE DRAWINGS

FIG. 1 is a side elevational view of a printing apparatus incorporating the record feeding apparatus of the invention, FIG. 2 is a top plan view of a fragmentary portion of the platen assembly showing a portion of the record feeding apparatus with a hold-down plate;

FIG. 3 is a view similar to FIG. 2 showing a record web in position to be fed by the record feeding apparatus, but omitting the hold-down plate;

FIG. 4 is an exploded perspective view of the record feeding apparatus;

FIG. 5 is a lateral sectional view of the record feeding apparatus in its assembled condition;

FIG. 6 is an enlarged top plan view similar to FIG. 3, but showing the feed wheel positioned exaggeratedly relative to the roll for the sake of clarity;

FIG. 7 is an enlarged top plan view of an alternative embodiment similar to FIG. 6 but showing the feed wheel and the roll positioned differently relative to each other.

DETAILED DESCRIPTION OF THE PREFERRED EMBODIMENTS

Figure 8:
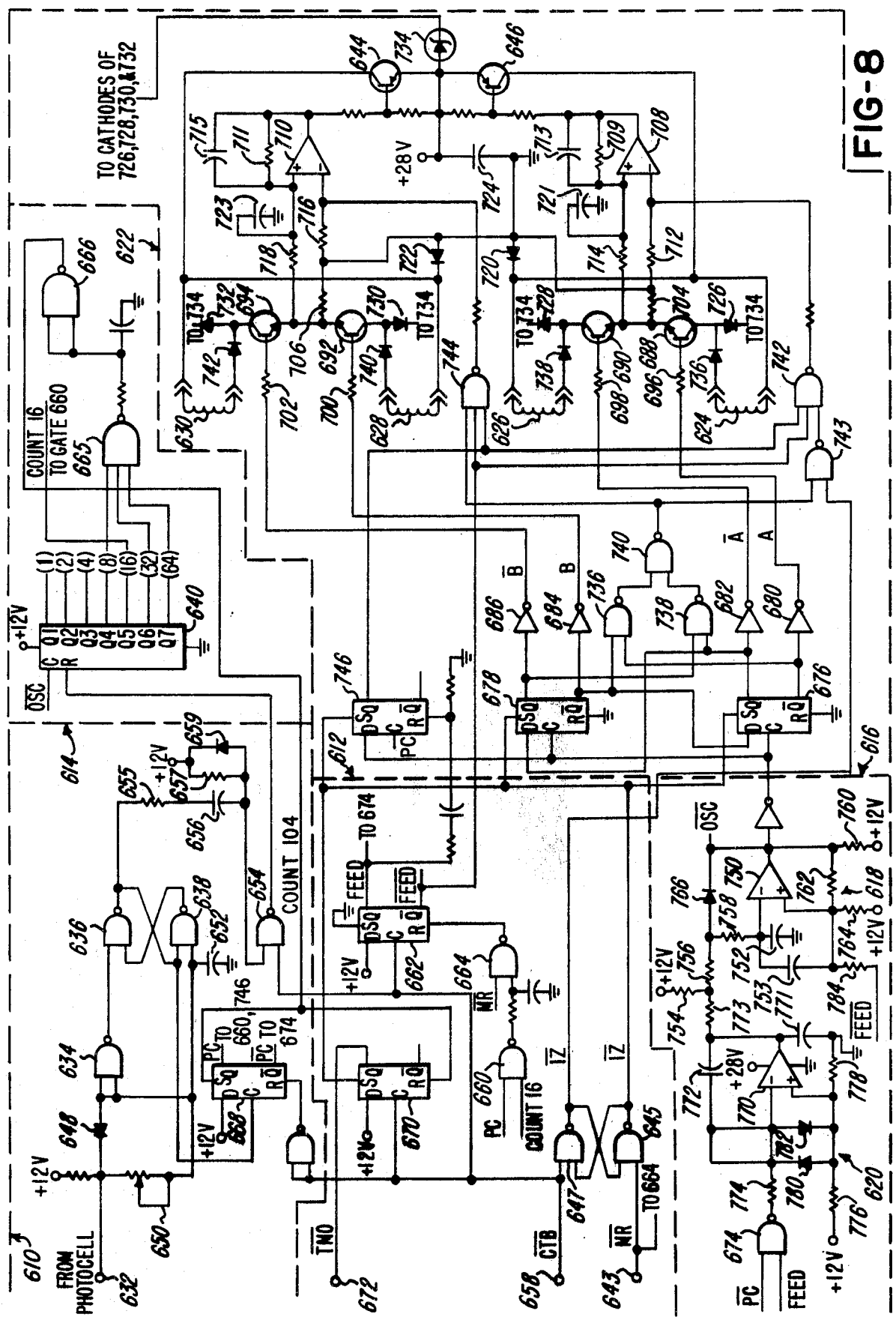
FIG. 8 is a schematic diagram showing the control logic and drive circuitry for the stepping motor.

With reference to FIG. 1, there is shown the record feeding apparatus generally indicated at 499 adapted for operation with the printing apparatus disclosed in U.S. Pat. No. 3,767,098 to Robert M. Pabodie. The entire disclosure of U.S. Pat. No. 3,767,098 is incorporated herein by reference. Accordingly, the same reference characters are used in the present application as were used in U.S. Pat. No. 3,767,098 to designate like components.

The drawings of the present application show the record feeding apparatus 499 as feeding a web of records. Consequently, the specification makes reference to the web, but it is to be understood that the invention is also applicable to the feeding of the sheets. Accordingly, the invention is not to be limited to feeding webs but also includes the feeding of sheets. Thus, the expression "record" as used in the present application includes both webs and sheets.

With reference to FIG. 1 there is shown a frame 31 to which a print head assembly 32 is fixedly mounted. An inking mechanism 35A is used to ink the print head assembly 32. An electric motor 49 selectively drives a drive shaft 52 through a clutch 51. The drive shaft 52 drives a crank 55 which in turn drives a connecting rod 58. A platen assembly 33 pivotally mounted by a pin 34 is driven alternately toward and away from the print head assembly 32 by the connecting rod 58. A severing mechanism 46 is used to sever record members 37 from the web W. A barrel cam 451 drives the inking mechanism 35A through an arm 452. The platen assembly 33 is provided with a guide plate 108' on which the web W is guided to the print head assembly 32 and the severing mechanism 46. The platen assembly 33 is provided with a platen frame 108 of which the plate 108' can be considered to be a part. A plate 108" secured to the plate 108' provides an edge guide for the web W.

With reference to FIG. 4 there is shown a stepping motor 500 having a drive shaft 501. A feed wheel generally indicated at 502 is suitably secured to the drive shaft 501 as by a set screw 503. The feed wheel 502 is rotatable in an enlarged hole 502' in the plate 108'. The motor 500 is secured to a motor mount 504. The motor 500 has a flange 505. Screws 506 (only one of which is shown in FIG. 4) pass through four holes 507 (only three of which are shown) and are received in threaded holes 508 in the motor mount 504. A bracket 509 is secured to the plate 108' by screws 510 (only one of which is shown). The screws 510 extend through holes 511 in the plate 108' and extend through cutouts 512 in the bight portion 513 of the bracket 509. A nut plate 514 has threaded holes 515 which receive the respective screws 510. The nut plate 514 clamps the bight portion 513 against the underside of the plate 108'. The bracket 509 includes depending arms 516 joined to the bight portion 513. The arms 516 have respective holes 517 for receiving a pivot pin 518. The pivot pin 518 passes through holes 519 in the motor mount 504 and is received in the holes 517. Accordingly, the pivot pin 518 and the bracket 509 mount the motor mount 504 and hence the motor 500 and the feed wheel 502 which it carries for pivotal movement. The pivot pin 518 is held in position by a retainer 520, the curved end 521 of which is received in an annular groove 522 on the outer surface of the pivot pin 518. A screw 522' is threadably received by the arm 516 at the left side of the bracket 509 as viewed in FIG. 4.

A counterweight 523 is secured to the underside of the motor mount 504 by a screw 524 which passes through a hole 525 and is threadably received in a threaded hole 526 in the motor mount 504. As best seen in FIG. 1, most of the mass to be counterbalanced resides in portion the stepping motor 500 which is disposed to the right of the pivot pin 518. The counterweight 523 is relatively long and essentially counterbalances all of the mass disposed to the right of the pivot pin 518 as viewed in FIG. 1. FIG. 1 shows the platen assembly 33 in its upward position so that one of the record members 37, defined by lines of partial severing 37', is in printing cooperation with the print head assembly 32. It will be appreciated that as the platen assembly 33 pivots downwardly away from that position, the amount of the mass required to be counterbalanced decreases which means that the feed wheel 502 will exert a greater upward force against the underside of the web W. However, this increase in force is slight and is well within the range of maximum desired for this purpose. A compression spring 526' received on a post 527 secured to the counterweight 523 exerts a downward force on the counterweight and an opposite upward force on the underside of the plate 108'. The purpose of the spring 526 is to insure that there is always adequate force being applied by the feed wheel 502 to the underside of the web W and to compensate for any bounce that may result when the platen assembly 33 starts and stops during the printing cycle.

A roll 528 is a needle bearing mounted on the shaft 530. The one marginal end of the shaft 530 is received in a bushing 531 received in a bracket 532. The bracket 532 is suitably secured to the platen frame 108. A set screw 533 is threaded into the bracket 532 and extends through a hole 534 in the bushing 531 and bears against the shaft 530. The other end of the shaft 530 is received by a rolled end 535 of a web hold-down plate 536. The plate 536 is locked to the one arm 516 by a retainer 537 and a set screw 538. The retainer 537 and a washer 539 are received by a stud 540 having a threaded end 541 received in one depending arm 516. The feed wheel 502 is shown to have a frictional surface generally indicated at 542. The frictional surface 542 is more specifically shown to comprise an annular ring having a multiplicity of small serrations 543 which extend in a radial direction as best shown in FIG. 6. The portion of the wheel 502 within the annular ring is recessed as indicated at 542'. Axis 501' of the shaft 501 is also the rotational axis of the feed wheel 502. It is apparent that the frictional surface 542 rotates in a plane that is perpendicular to the axis 501'. It is also apparent from FIG. 6 that the plane in which the frictional surface 542 rotates is parallel to face W' of the web W. The web W is disposed between the feed wheel 502 and the roll 528. More particularly the roll 528 exerts pressure against the other face W'" of the web W in opposition to the force exerted by the frictional surface 542 at the pinch point P.

The web W is fed in the direction of arrow A as shown in FIGS. 3 and 6 in the downstream direction. As best shown in FIG. 6 the pinch point P is disposed upstream of the rotational axis 501' by a distance D. In addition the pinch point P is disposed laterally between the rotational axis 501' and edge E of the guide 108". The resultant force indicated by vector VR is comprised of a force vector VR1 of large magnitude extending in the longitudinal direction for feeding the web longitudinally and a force vector VR2 of small magnitude extending in the lateral direction for driving the web W laterally to cause its side edge se1 to be in contact with edge E with concomitant slippage between the frictional surface 542 and the side W' of the web W to prevent the web from buckling laterally. The force vector VR extends tangentially to the frictional surface 542 of the wheel 502. Although shown exaggerated in FIG. 6, the force vector VR2 is very small compared to the force vector VR1. Nevertheless, if there were no slippage between the frictional surface 542 and the web W, the web would buckle some laterally between the pinch point P and the side edge se1 of the web W. In that the vector VR2 is relatively small and the web W which is comprised of tag stock is relatively stiff and because of the small amount of slippage that takes place, the side edge se1 of the web W is always in contact with and guided by the edge E of the guide 108" as the web W is driven in the direction of arrow A.

In order to facilitate threading of the web W through the printing apparatus and specifically to facilitate insertion in the web W between feed wheel 502 and the roll 528 during the threading process, there is provided a lever 544 which is pivotally mounted on a pivot pin 545. The pivot pin 545 is secured to the frame 108 by a threaded portion 546. The lever 544 is held on the pivot pin 545 by a retainer 546. The lever 544 has a manually engageable surface or button 547. As viewed in FIG. 5, depressing the button 547 pivots the lever 544 counterclockwise in that the lever contacts the motor mount 504, the motor mount 504 and the motor 500 and the feed wheel 502 which it pivots clockwise (FIG. 1) about the pivot pin 518. With the button 547 held depressed the feed wheel 502 is away from the roll 528 sufficiently to allow the free end of the web W to be easily inserted between the feed wheel 502 and the roll 528. Once this has been accomplished the button 547 can be released and the counterweight 523 and the spring 526 will urge the surface 542 of the wheel 502 into pressure contact with face W'. In that the pinching force exerted on the web W at the pinch point P is high relative to the force exerted by the frictional surface 542 on the face W' at other than the pinch point P, almost all the driving force transmitted to the web W takes place at the pinch point P. The forces transmitted to the web W by the frictional surface 542 at other than the pinch point P do not interfere with reliable feeding of the web W. The pinch point P is not a finite point but rather it is the area of the web which experiences the pressure exerted by the action of the frictional surface 542 and the roll 528.

In the embodiment of FIG. 7, the web W is fed in the downstream direction indicated by arrow A1. The pinch point P1 is disposed downstream of the rotational axis 501' by a distance D1. In addition the pinch point P1 is disposed laterally beyond the rotational axis 501'. The resultant force indicated by vector VR3 is comprised of a force vector VR4 of large magnitude extending in the longitudinal direction for feeding the web longitudinally and a force vector VR5 of small magnitude extending in the lateral direction for driving the web W laterally to cause its side edge se1 to be in contact with edge E with concomitant slippage between the frictional surface 542 and the side W' of the web W to prevent the web from buckling laterally. The force vector VR3 extends tangentially to the frictional surface 542 of the wheel 502. Although shown exaggerated in FIG. 7, the force vector VR5 is very small compared to the force vector VR4. Nevertheless, if there were no slippage between the frictional surface 542 and the web W, the web would buckle some laterally between the pinch point P1 and the side edge se1 of the web W. In that the vector VR5 is relatively small and the web W which is comprised of tag stock is relatively stiff and because of the small amount of slippage that takes place, the side edge se1 of the web W is always in contact with and guided by the edge E of the guide 108" as the web W is driven in the direction of arrow A1. In the embodiment of FIG. 7 the motor rotates in the opposite direction from the direction of rotation of the motor 500 in the embodiment of FIGS. 1 through 6.

If it is desired to change the position of the pinch point P or P1 which will thus change the respective vectors VR1 and VR2, or VR3 and VR4 this can be accomplished by loosening the screws 510 and shifting the bracket 509 longitudinally. The cutouts 512 are large enough so that the bracket 509 can also be shifted laterally. Upon movement of the bracket 509 to the selected position and tightening of the screws 510 the bracket 509 is secured in the selected position and thus the feed wheel 502 will be in the desired position relative to the roll 528.

Stepping motor 500 and stepping motor control circuit are utilized to accurately position the record to be printed under the print head assembly. In this embodiment, the stepping motor 500 has 200 steps per revolution, or 1.8° per step, is employed to advance the record through the printing apparatus. Feed wheel 502, mechanically coupled to the stepping motor, is utilized to drive the record, and the diameter of the feed wheel is selected so that one step of the motor results in approximately 13.3 mils of record travel.

In general, the control logic and drive circuitry for the stepping motor 500 comprises a photocell circuit 610, a feed circuit 612, a step counting circuit 614, a step rate control circuit 616 comprising an oscillator 618 and a slew control circuit 620. A motor driving circuit including a sequencing circuit 622 is used for alternately energizing four stepping motor windings 624, 626, 628 and 630.

The record web W is fed into the printing apparatus as a continuous strip having a plurality of notches 37n or other indices formed in one edge thereof to define the spacing between the record members 37. These notches 37n are sensed by a photocell (not shown) so that the position of each record member 37 with respect to the print head assembly may be determined and the feeding operation terminated when a record member 37 is in the printing position.

The output signal from the index detecting photocell is applied to an input point 632 of the photocell circuit 610 where it is squared by a Schmitt trigger comprising three NAND gates 634, 636 and 638 prior to being applied to the rest of the logic circuitry. The squared pulses from the photocell circuit 610 are applied to a seven stage binary counter 640 within the counting circuit 614 together with oscillator pulses from the oscillator circuit 618. The pulse from the photocell circuit 610 serves to reset the counter 640, and the number of oscillator pulses returned from the $\overline{OSC}$ output of the oscillator 616 subsequent to the receipt of each pulse from the photocell circuit 610 are counted by the counter 640 to determine the position of each ticket. The COUNT 16 output is applied to the feed circuit 612 to terminate the feeding of the web W after the record member 37 has been advanced into the printing position. This occurs after the stepping motor has been advanced approximately 16 steps following the detection of a notch 37n. A 3-input NAND gate 665 is connected to the COUNT 8, COUNT 32 and COUNT 64 outputs of the counter 640 to provide a $\overline{COUNT\ 104}$ timeout signal to terminate the operation of the printing apparatus if no photocell signal has been received after 104 counts (8 + 32 + 64).

The speed at which the stepping motor 500 is stepped is determined by the frequency of the oscillator 618. Because of the inertia of the stepping motor 500 and the feed wheel 502, it is desirable initially to step the motor at a relatively slow, gradually increasing, rate until a maximum rate is achieved, and then to gradually slow the rate prior to stopping the web W for printing and severing. This is accomplished by controlling the oscillator 618, which is a variable rate oscillator having a maximum pulse rate of approximately 700 pulses per second, by a slew generator 620 that initially increases the pulse rate of the oscillator 618 at a gradual rate, and then gradually decreases the pulse rate before the oscillator 618 is turned off.

The pulses from the oscillator 618 control the switching circuit 622 for alternately energizing the windings 624, 626, 628 and 630 of the stepping motor to provide the incremental stepping action. A half step generator (described in a subsequent portion of the specification) within the switching circuit 622 compensates for errors resulting from the lack of synchronization between the oscillator 618 and the output of the photocell circuit 610, and permits the stepping motor 500 to be advanced either 15.5 or 16 steps following the receipt of a photocell pulse, depending on the relative phase of the oscillator signal and the photocell pulses. In addition, a pair of current limiting switching transistors 644 and 646 limit the maximum amount of drive current that can be applied to the windings 624, 626, 628 and 630 while providing a high initial drive for rapidly accelerating the stepping motor.

Referring to FIG. 8 in greater detail, a master reset pulse $\overline{MR}$ is applied to an input point 643 when power is applied to the apparatus. The $\overline{MR}$ pulse resets all of the logic and prevents the stepping of the web W until an initiate pulse is applied to an input point 658 of the feed circuit 612. The initiate pulse is generated by a cam lobe (not shown) on the printer drive shaft 652. The initiate pulse applied to the input 658 toggles a latch formed by a pair of gates 645 and 647 to initiate the feeding operation. The photocell scans the advancing web W, and whenever an index notch 37n is detected, a pulse is applied through a diode 648 to the NAND gate 634 which is connected as an inverting amplifier. The NAND gates 634, 636 and 638 serve as a Schmitt trigger to square up the pulse from the photocell, and the diode 648, in conjunction with a potentiometer 650 and a capacitor 652 serve as a variable delay network for the photocell pulse. The variable delay network permits a vernier adjustment of the web position to be made by adjusting the potentiometer 650.

The output from the NAND gate 636 is coupled to a NAND gate 654 by means of a resistor 655 and a coupling capacitor 656. The NAND gate 654 has a second input connected to the output 658 and provides an output pulse for resetting the counter 640 upon receipt of a low state initiate pulse $\overline{CTB}$ at the input point 658 and a low state photocell pulse (indicating the presence of a notch 37n) from the NAND gate 636. A resistor 657 and a diode 659 return the input of the gate 654 to a positive potential to terminate the reset signal if the output of the gate 636 remains low an excessively long time. An excessively long low state condition can occur if no web W being fed through the apparatus (e.g. after all records members 37 in a web W have been printed), and it is necessary to terminate the reset signal to allow the apparatus to turn off automatically under such a condition.

The $\overline{OSC}$ output from the oscillator 618 is coupled to the clock input of the counter 640 which operates both as a timeout counter and as a record positioning counter. The counter 640 counts the number of oscillator pulses received subsequent to the receipt of the trailing edge of the $\overline{CTB}$ pulse from the NAND gate 654.

Initially, the counter 640 operates in a timeout mode to terminate the feeding of the record if 108 pulses are received subsequent to the receipt of the $\overline{CTB}$ pulse from the NAND gate 654. If a photocell pulse is received from the NAND gate 636 (via NAND gate 654) prior to the receipt of 108 pulses from the oscillator 618, the counter 640 is again reset, and the feeding of the record is terminated 16 pulses after the receipt of the trailing edge of the photocell pulse.

The timeout feature is provided by a NAND gate 665. The COUNT 8, COUNT 32 and COUNT 64 outputs are applied to the NAND gate 625 which provides a low output upon the coincidence of the COUNT 8, COUNT 32 and COUNT 64 outputs. The output from the NAND gate 665 is inverted by a NAND gate 666 which is connected as an inverting amplifier to provide a COUNT 104 signal upon receipt of the low output from the NAND gate 665. The COUNT 104 signal is applied to the set input S of a photocell flip-flop 668 and to the reset input R of a timeout flip-flop 670. The timeout flip-flop 670 provides a $\overline{TMO}$ signal at an output 672 that goes low to indicate that a timeout has occurred. The Q output of the photocell flip-flop 668 is applied to a NAND gate 674 to terminate the production of pulses by the oscillator circuit 616. This prevents further stepping of the stepping motor and advancement of the record following the timeout.

If a photocell pulse is received within the 108 counts, the counter 640 is again reset by the trailing edge of the photocell pulse received from the NAND gate 636. The counter 640 again begins to count from zero, and the COUNT 16 output of the counter 640 is applied to a NAND gate 660 for resetting a feed flip-flop 662 via a second NAND gate 664. The flip-flop 662 generates FEED and $\overline{FEED}$ signals for terminating the feeding of records after 16 pulses have been received from the oscillator 618. The $\overline{FEED}$ signal is applied to the oscillator 618 to terminate the generation of pulses, and the FEED signal is applied to the NAND gate 674 to reduce the oscillator pulse rate for decelerating the stepping motor prior to turn off.

The sequence of energization of the stepping motor coils 624, 626, 628 and 630 is controlled by a pair of flip-flops 676 and 678 which are clocked by pulses from the oscillator 616. The Q output of the flip-flop 676 is connected to the data input D of the flip-flop 678 and the $\overline{Q}$ output of the flip-flop 678 is connected to the data input D of the flip flop 676. Consequently, the Q output of the flip-flop 676 is clocked into the flip-flop 678, and the Q output of the flip-flop 678 is clocked into the flip-flop 676 in synchronism with the clock pulses from the oscillator 616. The Q and $\overline{Q}$ outputs from the flip-flops 676 and 678 are inverted by four inverting amplifiers 680, 682, 684 and 686 which provide A, $\overline{A}$, B and $\overline{B}$ outputs to four switching transistors 688, 690, 692 and 694 via four coupling resistors 696, 698, 700, and 702, respectively. The four inverting amplifiers 680, 682, 684 and 686 provide an output sequence of AB, $\overline{AB}$, and $A\overline{B}$ for sequentially rendering the transistors 688, 690, 692 and 694 conductive as pairs 688, 692; 690, 692; 690, 694; and 688, 694 and for sequentially energizing the pairs of windings 624, 628; 626, 628; 626, 630; and 624, 630. The sequential energization of the winding pairs causes the stepping motor to be stepped one full step each time a successive pair of windings is energized.

Because the windings 624, 626, 628 and 630 are highly inductive, the current through the windings builds up at a gradual rate determined by the voltage of the power supply and the inductance of the windings. Therefore, in order to provide adequate current to assure sufficient stepping motor torque, it is desirable to apply the entire 28 volt output of the printer power supply directly across the windings 624, 626, 628 and 630. However, because the windings 624, 626, 628 and 630 present an inductive load to the power supply, the windings can draw excessive current after they have been connected across the power supply for a sufficient period of time for the switching transient to decay. Accordingly, the current limiting transistors 644 and 646 are employed to limit the maximum value of current that can flow through the windings 624, 626, 628 and 630. The current limiting transistor 646 works in conjunction with the switching transistors 688 and 690 to apply current to the windings 624 and 626, and the current limiting transistor 644 works in conjunction with the transistors 692 and 694 to apply current to the windings 628 and 630. Because not more than two windings are ever energized at any one time, each of the current limiting transistors 644 and 646 is shared with each current limiting transistor alternately supplying current to one of the two simultaneously energized windings.

Both of the current limiting transistors 644 and 646 are normally saturated, and the current flowing through each of the transistors 644 and 646 is channelled to one of the windings by one of the switching transistors 688, 690, 692 and 694. The current flowing through the windings 624 and 626 is sensed by a current sensing resistor 704 connected in series with the emitters of the switching transistors 688 and 690, and the current flowing through the coils 628 and 630 is sensed by the current sensing resistor 106 connected in series with the emitters of the switching transistors 692 and 694. The current sensing resistors 604 and 606 are connected across the inputs of a pair of respective operational amplifiers connected as Schmitt trigger comparators 708 and 710 by means of coupling resistors 712, 714, 716 and 718. The Schmitt trigger comparators 708 and 710 sense the voltages across the respective resistors 704 and 706 and provide an output signal to a respective one of the current limiting transistors 646 and 644 to render the current limiting transistor nonconductive when the voltage across the respective one of the resistors 704 and 706 exceeds a predetermined level. Two resistors 709 and 711 are used to provide the comparators 708 and 710 with a predetermined amount of hysteresis, and a pair of speed up capacitors 713 and 715 are used to speed up the switching action.

Because of the inductive nature of the stepping motor windings 624, 626, 628 and 630, a high voltage inductive surge would be generated each time one of the transistors 644 and 646 was switched to its nonductive state if an alternate current path were not provided. A pair of diodes 720 and 722 are utilized to provide this alternate path. The diode 720 is connected across each of the series circuits comprising the windings 624, 626 and the transistors 688, 690 to permit the current to continue flowing through the one of the windings 624, 626 that had been energized prior to the turning off of the current limiting transistor 646. The diode 722 provides a similar function for the windings 628 and 630. As a result, a gradual decaying current continues to flow through the windings after the current limiting transistors 644 and 646 have been switched off. The current through the windings continues to decay until the voltage across one of the current sensing resistors 704 and 706 drops below a predetermined level which causes the respective one of the comparators 708 and 710 to change state again and to render the respective one of the switching transistors 646 and 644 conductive. This switching of the transistors 644 and 646 occurs at a rate of approximately 7000 Hz.

Because of the relatively high currents being switched, the 7000 Hz switching signal can cause undesirable interference and transient suppressing circuitry including resistors 714 and 718 and capacitors 720, 722 and 724 is used to minimize the interference thus generated. In addition, diodes 726, 728, 730 and 732 are connected to the respective switching transistors 688, 690, 692 and 694 to an anode of a Zener diode 734 to limit the voltage transient at the collectors of the switching transistors to a maximum of approximately 50 volts. Four diodes 736, 637, 740 and 742 are used to prevent any reverse voltage transient from being applied to the collectors of the switching transistors, and to prevent reverse current from flowing through the transistors 688, 690, 692 and 694.

Because the oscillator 616 is not synchronous with the pulses provided by the photocell circuit 610, the amount of linear web travel subsequent to the receipt of a photocell pulse is dependent upon the relative time of receipt of the signal from the photocell circuit 610 and the output pulses from the oscillator 616. For example, if the photocell signal is received just prior to an oscillator pulse, the distance subsequently traveled by the web corresponds to 16 steps of the stepping motor. If the photocell signal is received just after an oscillator pulse, nearly 17 steps of web travel results. Thus, a nonuniformity between record members 37 corresponds to one stepping motor increment plus other errors caused by feeding apparatus 499 tolerances can result.

In order to minimize such errors, a circuit for generating half step increments is provided. The half step increments are generated by suppressing the energization of one of the windings to generate a half step sequence AB, B, $\overline{AB}$, A, $\overline{AB}$, B, $\overline{AB}$, A. The half step increment is used only for the last step of the sequence and is enabled by three NAND gates 736, 738, and 740 which function as an exclusive OR for disabling the drive to one of the windings if A and B are both 1 or both 0. The output of the NAND gate 740 is applied to a pair of three input NAND gates 742 (via NAND gate 743) and 744. The NAND gates 742 and 744 are connected to the respective comparators 708 and 710 for disabling the respective one of the current switching transistors 646 and 644 upon receipt of a signal from the NAND gate 740 indicating that A and B are both 1 or both 0, the $\overline{\text{FEED}}$ signal from the feed flip-flop 662 indicating the sixteenth step, and the Q output of a half step flip-flop 746 indicating that the photocell signal was received shortly before the oscillator pulse.

The half step flip flop 746 measures the time of arrival of the photocell signal in relation to the stepping pulse from the oscillator circuit 616. If the photocell signal is received before the midpoint of the oscillator signal, an output for disabling one of the current limiting transistors 46 and 44 is provided, and the motor is advanced only one half step to provide a total of only 15.5 steps of advance. If the photocell signal is received during the last half of the oscillator pulse, the stepping motor 500 is advanced a full 16 steps. As discussed previously, the NAND gates 742 and 744 permit the current limiting transistors 746 and 744 to be disabled only during the last step of the sixteen step sequence, as indicated by the $\overline{\text{FEED}}$ output of the feed flip-flop 662.

The oscillator circuit 618 comprises a relaxation oscillator including a comparator 750 and associated biasing circuitry and a capacitor 752. The capacitor 752 is charged from a 12 volt source by means of resistors 754, 756, and 758. Biasing resistors 760, 762 and 764 provide a reference voltage to the (+) input of the comparator 750 to which the voltage across the capacitor 752 is compared. As the capacitor 752 charges through the resistors 754, 756 and 758, the capacitor voltage increases until a level greater than the level of the voltage applied to the (+) terminal of the comparator 750 is reached. At this point, the output of the comparator 750 changes state (goes low), and the capacitor 752 is discharged through the resistor 758 and a diode 766. After the capacitor 752 has been discharged to a level below that provided by the biasing resistors 760, 762 and 764, the operational amplifier 750 changes state again and the charging cycle is repeated. The resistor 762 determines the hysterisis of the comparator 750 and hence the level to which the capacitor 752 must discharge before the comparator again changes state. A capacitor 753 serves as a noise filter at the input of the comparator 750.

The frequency of oscillation is controlled by the ramp generator 620. The ramp generator 620 comprises a comparator 770 which provides a gradually increasing voltage at its output upon receipt of a FEED and a $\overline{PC}$ signal at the inputs of the NAND gate 674. The output signal from the comparator 770 is applied to the junction of the resistors 754 and 756 (and a stabilizing capacitor 771) through a resistor 773. The signal from the amplifier 770 changes the voltage at the junction of the resistors 754 and 756 and varies the rate at which the capacitor 752 is charged, and hence, the rate of oscillation of the oscillator 618. Initially, the output voltage of the amplifier 770 is low, thereby providing a slow charging rate for the capacitor 752 and a relatively low oscillation rate for the oscillator 618. As the voltage at the output of the comparator 770 increases (as a result of the discharging of the capacitor 772 through a resistor 774), the oscillation rate of the oscillator 618 increases until its maximum rate of approximately 700 Hz. is reached. This oscillation rate is maintained, until the FEED (or $\overline{PC}$) signal is removed. At this point, the output voltage of the amplifier 770 gradually decreases as the capacitor 772 is charged to a level determined by a biasing network including resistors 776 and 778 and the diodes 780 and 782. Removal of the FEED signal also causes a $\overline{FEED}$ signal to be applied to the (+) input of the comparator 750 through a resistor to raise it to a level that cannot be exceeded by the voltage across the capacitor 752, thereby preventing further oscillation.

Other embodiments and modifications of this invention will suggest themselves to those skilled in the art, and all such of these as come within the spirit of this invention are included within its scope as best defined by the appended claims.

I claim:

1. A control system for a stepping motor having a drive shaft and a plurality of windings, the sequential electrical energization of said windings being effective to rotate said drive shaft in predetermined increments, the control system comprising: means for alternately energizing the windings in a predetermined sequence, the energizing means including means for altering the sequence to change the magnitude of the increments; and means connected to said energizing means for determining the rate at which the windings are energized, said rate determining means including means for gradually increasing the energizing rate for accelerating the stepping motor and for gradually decreasing the energizing rate for decelerating the stepping motor.

2. A control system as defined in claim 1, wherein the energizing means includes means for limiting the current through the windings.

3. A control system as defined in claim 2, wherein the current limiting means includes a switching current regulator.

4. A control system as defined in claim 3, wherein the stepping motor includes four windings and the energizing means includes four switch means, one of the switching means being connected in series with each of the windings.

5. A control system as defined in claim 4, wherein the current limiting means includes a second switching current regulator, the switching current regulator being connected in circuit with two of the switch means for alternately supplying current to two of the windings, and the second switching current regulator being connected in circuit with the other two of the switch means for alternately supplying current to the other two of the windings.

6. A control system as defined in claim 1, wherein the energizing means includes logic means for rendering the energizing means operative for sequentially energizing the windings in pairs.

7. A control system as defined in claim 6, wherein the logic means includes means for suppressing the energization of one winding of one of the energized pairs in the predetermined sequence.

8. A control system for a stepping motor having a plurality of windings, comprising: means for alternately energizing the windings in groups of at least two in a predetermined sequence; and means responsive to an external condition for suppressing the energization of one winding of one of the groups in response to the external condition.

9. A control system as defined in claim 8, further including pulse producing means for rendering the energizing means operative to energize the successive groups of windings of the predetermined sequence in response to a pulse therefrom, and wherein the external condition responsive means is responsive to the relative time of occurrence of the external condition and the pulse from the pulse producing means.

10. A control system as recited in claim 8, wherein the stepping motor includes a drive shaft and is responsive to the successive energization of the windings in groups for incrementally rotating the drive shaft in first predetermined increments and is responsive to the suppression of the energization of the one winding for rotating the drive shaft a second predetermined increment less than said first predetermined increments.

11. A control system as recited in claim 8 wherein said external condition is the position of a workpiece.

* * * * *